March 11, 1958  L. F. GUIMBRETIERE ET AL  2,825,937
METHOD AND MEANS FOR DRAWING TEXTILE SLIVERS
Filed Nov. 6, 1952  7 Sheets-Sheet 1

INVENTORS:
Louis François Guimbretiere,
André Georges Pollet, and
Eugène Jean Sorez.
By Frank H. Wisck
Att'y March 11, 1958 L. F. GUIMBRETIERE ET AL 2,825,937
METHOD AND MEANS FOR DRAWING TEXTILE SLIVERS
Filed Nov. 6, 1952 7 Sheets-Sheet 2

Fig.3

INVENTORS:
Louis François Guimbretiere
André Georges Pollet, and
Eugène Jean Sorez
By Frank H. Nicol
Att'y March 11, 1958  L. F. GUIMBRETIERE ET AL  2,825,937
METHOD AND MEANS FOR DRAWING TEXTILE SLIVERS
Filed Nov. 6, 1952  7 Sheets-Sheet 5

March 11, 1958  L. F. GUIMBRETIERE ET AL  2,825,937
METHOD AND MEANS FOR DRAWING TEXTILE SLIVERS
Filed Nov. 6, 1952  7 Sheets-Sheet 7

INVENTORS:
Louis François Guimbretière
André Georges Polletand
Eugène Jean Sorey
By Frank H. Nisch
Att'y

United States Patent Office 2,825,937
Patented Mar. 11, 1958

2,825,937

METHOD AND MEANS FOR DRAWING TEXTILE SLIVERS

Louis François Guimbretiere, Montfaucon-sur-Moine, André Georges Pollet, Tourcoing, and Eugène Jean Sorez, Roubaix, France Application November 6, 1952, Serial No. 319,096

Claims priority, application France November 8, 1951

6 Claims. (Cl. 19—130)

It is a well known fact that textile threads are obtained, starting from natural discontinuous fibres such as wool, cotton and the like, by forming said fibres into ribbons that are drawn until a sliver of small cross-sectional area is obtained, which sliver is then twisted so as to produce the desired thread.

Hereinafter, we will consider sheets, ribbons and slivers of textile material wherein the fibres are distributed at random with the exclusion of all ribbons and slivers constituted by continuous fibres cut to predetermined lengths with a view to allow their drawing.

We will term hereinafter "ribbon" a mass of fibres that assume a substantially parallel formation, said mass not being spread out and having a cross-sectional density, i. e. a number of fibres in a cross-section that is high and comparable with the figures appearing generally in the spinning processes. We will term "sheet" a spreadout ribbon while we will call "bundle" a strip formed in said sheet and "sliver" a mass of fibres in parallel formation having a low cross-sectional density.

Hitherto, the drawing was obtained by causing the ribbon to pass between two pairs of rollers of which the first pair formed the feed rollers and the second pair the drawing rollers or cylinders. The peripheral speed of the feed cylinders was less than the peripheral speed of the drawing cylinders. This produced a tractional stress on the ribbon together with a relative sliding movement of the fibres constituting it, which lead to the production of the desired sliver.

The rate of drawing, i. e. the ratio between the cross-section of the ribbon at the start and the cross-section of the sliver obtained, was small and it has not been possible to rise beyond 20 as a value of the drawing rate without this leading readily to a breaking of the sliver.

In the spinning methods known hitherto, the drawing was associated with plaiting steps; in other terms, after the drawing step executed at a drawing rate of 10 e. g., two or three of the slivers obtained were again associated and drawn together. Such plaiting steps led consequently to cutting down partly the result obtained by the preceding drawing steps and consequently, after said plaiting further drawing steps were necessary.

The drawing method according to our invention removes the above drawbacks and allows proceeding with a single drawing step at a very high drawing rate.

The drawing method provided by us, starting from a sheet of discontinuous fibres in which said fibres are distributed irregularly, is characterized according to our invention by the fact that the sheet is caused to advance at a reduced speed and is held fast by a feed device producing a moderate clamping action which allows the sliding of the fibres with reference to one another and there are executed, along the free edge of the sheet thus held in position, conventional drawing steps, as provided by a positive drive at a high speed of the fibres under the action of a drawing device engaging fractions of the breadth of the free edge of the sheet, the clamping stress exerted by the drawing device on the fibres submitting the latter to a tractional stress that is higher than the retaining force acting on the fibres as a result of the clamping of the sheet inside the feed device, the different fractions of the free edge of the sheet being drawn in succession.

According to a further feature of the invention, we act in succession, along a fraction of the breadth of the front edge of the sheet of fibres and over a depth equal to a fraction of the average length of the fibres, on the ends of the fibres forming said sheet and we exert a traction on the fibres thus taken hold of at each elementary operative step, so as to remove them from the sheet, after which these steps are repeated in succession, during each cycle, on the different fractions of the breadth of the sheet and throughout said breadth, until the sheet is allowed to progress during the cycle by the above-mentioned fraction of the average length of fibres and we drive, at a speed equal to the feed speed multiplied by the drawing rate, the fibres or bunches of fibres thus removed from the sheet, and finally we collect these removed fibres with a partial overlapping so that they may form a sliver.

The method according to our invention consists thus in producing a statistical dispersion reproducing on a longitudinally enlarged scale the statistical dispersion of the original sheet, but this method which does not act on the statistical dispersion of the original sheet, does not remove the irregularities in the said original statistical dispersion of the fibres. To remove this last mentioned drawback, and in particular to cut out the irregularities in the density of the fibres along a same transverse line, it is necessary to proceed with a conventional plaiting so as to give variable shifting in the drawn sliver to the fibres in accordance with the transverse position assumed by said fibres in the original sheet.

Our method thus improved may be executed in various manners: according to a first embodiment, we subdivide actually or ideally the original sheet into a number of parallel bundles and we draw each of these elementary bundles according to the above-disclosed procedure, the drawing being performed in each elementary bundle over a same transverse line of the original sheet, and the fibres thus removed are caused to follow parallel paths and we then collect them while delaying, with reference to one another, the unitary drawn slivers thus obtained, the delay depending on the transverse relative position of the slivers. This method corresponds thus to a plaiting operation of the different transverse sheet elements or bundles with one another during the drawing.

However, by reason of the high drawing ratio obtained, this first embodiment of our method leads merely to an improvement of the transverse statistical dispersion of the fibres in the original sheet. In spite of the substantial improvement reached in this manner, this procedure is not sufficient for the complete cutting out of the irregularities in the statistical dispersion of the original sheet and, in particular, the irregularities due to the cyclic phenomena arising in the execution of the conventional drawing or combing methods to which the ribbon may have previously been submitted.

According to a second improved embodiment of our method which completely cuts out the above-mentioned drawbacks, we proceed with the drawing out in the different elementary bundles no longer along a common transverse line of the original sheet, but along lines that are shifted longitudinally for the different elementary bundles.

This latter improvement is obtained easily by subdividing, in a step preliminary to the actual drawing, a ribbon produced by a common conventional stretching head into a plurality of unitary ribbons and introducing these into a drawing head adapted to operate, in accordance with our improved method, said elementary ribbons receiving a longitudinal shifting as defined hereabove.

Our invention has also for its object a machine for executing our improved drawing method, said machine comprising a feed gear driving the sheet to be drawn at a reduced speed and including at least two elements engaging each other along a line extending transversely with reference to the sheet and submitted to the action of clamping means, a drawing device including at least two elements engaging each other along a line also extending transversely of the sheet and submitted to the action of clamping means, said drawing means being positioned in register with the feed gear and being adapted to carry along the fibres engaged by it at a speed that is higher than the speed at which they have been driven by the feed gear and, lastly, means for conveying and collecting the fibres thus removed from the sheet to form them into the shape of staple; the main feature of this machine consists in that one of the lines of engagement between the two pairs of elements, submitted to the action of clamping means, is interrupted so that the clamping stress exerted on the interengaging elements of the drawing means may be higher than the clamping stress exerted by the interengaging elements of the feed gear for limited fractions of the breadth of the sheet, while means are adapted to shift transversely, according to a predetermined cycle of operation and throughout the breadth of the front edge of the sheet, the contacting areas between the interrupted elements.

We will now describe by way of example a preferred embodiment of our improved method and various embodiments of the machine according to our invention, reference being made to accompanying drawings, wherein.

Figure 1:
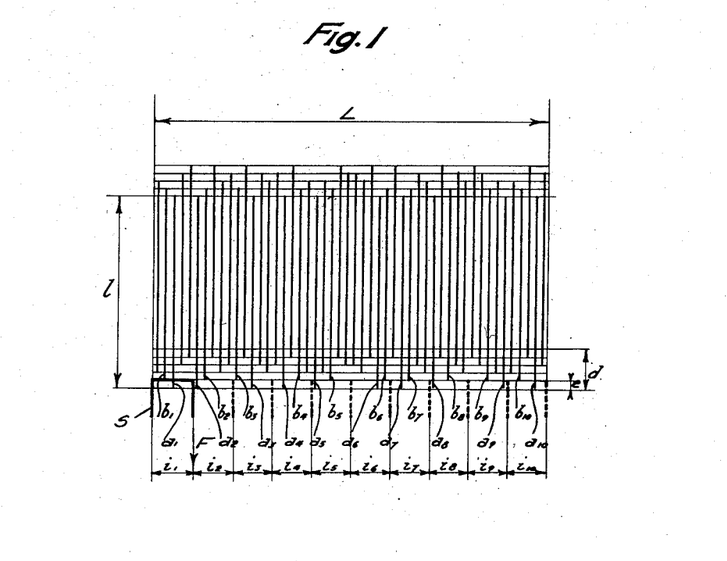
Fig. 1 is a plan view of an idealized sheet of fibres.

Turning to Fig. 1, the section shown of the sheet of fibres includes only those fibres the ends of which are located within a distance $d$ from the front edge of the sheet, said distance corresponding in the drawing to 5 times the depth $e$ within which the fibres are removed at each elementary operative step; the fibres have been illustrated as having a length $l$ equal to 25 times the depth $e$. This theoretical arrangement of the fibres in the sheet is statistically true for a regular sheet, because the number of fibres the ends of which lie within the depth $e$ is equal to the transverse density of the fibres in the sheet, divided by the ratio between the average length of the fibres and the said depth $e$. It will be supposed that, according to the method disclosed, the ends of the fibres extending over $\frac{1}{10}$ of the breadth of the sheet, are taken hold of at each elementary operation throughout the depth $e$.

In the theoretical sheet illustrated, it should be supposed that the transverse density of the fibres is equal to 250, whereby each elementary operative step leads to the engagement of a single fibre. Obviously, in practice, the density of the fibres in the sheet is higher than that mentioned hereinabove and approximates in fact a high multiple thereof. Statistically considered, each elementary fibre-engaging operation would lead to the extraction of a number of fibres equal to such a multiple.

Figure 2:
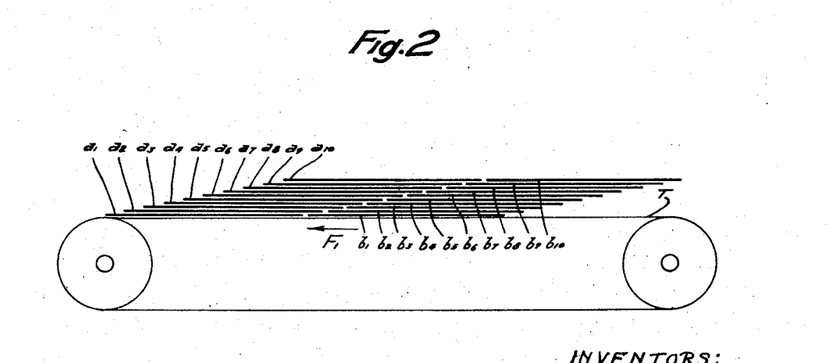
Fig. 2 is a diagram showing the arrangement of the fibres of the sheet shown in Fig. 1 after the drawing operation.

During the first elementary fibre-removing step executed in the first transverse area $i_1$, we take hold of a fibre $a_1$ the end of which lies within the depth $e$ beginning at the front edge of the sheet. This fibre $a$ is removed in the direction of the arrow F by a distance longer than the fibre $l$ and the fibre thus released is fed onto a conveyor T moving in the direction of the arrow $F_1$ (Fig. 2), on which it is laid. The fibre-engaging member S is then brought into the area $i_2$ and the above-described operative step is repeated so as to remove the fibre $a_2$ which is superposed onto the fibre $a_1$ with a predetermined longitudinal shifting equal, in the case considered, to $\frac{1}{10}$ of $l$, after which the operation continues with the following fibres $a_3$, $a_4$, etc. When the fibre-engaging member has moved throughout the breadth of the front of the sheet, said sheet is caused to progress by a distance $e$ and the operation is begun over again starting with the area $i_1$ so as to provide for the removal of the fibre $b_1$ which, by reason of the selected ratio of overlapping between the successive fibres will be laid in alignment with the first fibre $a_1$. In practice, the longitudinal progression of the sheet is subdivided into fractional steps, said sheet advancing by $e/n$ after each removal of a fibre, $n$ being the number of elementary fibre-removing steps required for operation throughout the front edge of the sheet.

It should be remarked at this point that if the rate of overlapping were different, e. g. if the front end of the removed fibre $a_2$ were shifted with reference to the front end of the fibre $a_1$ by $\frac{1}{5}$ of the average length $l$ of the fibres, instead of $\frac{1}{10}$, the fibre $a_6$ would be located in immediate alignment with the fibre $a_1$. The transverse density of the sliver obtained on the conveyor T would be $\frac{1}{2}$ the density illustrated in Fig. 1 and the rate of drawing would be double.

In the example illustrated in which there is removed at each operative step $\frac{1}{10}$ part of the number of fibres, the ends of which are located starting from the front edge of the sheet within a depth equal to $\frac{1}{25}$ of the average length $l$ of the fibres while the rate of overlapping of the elementary fibres or bunches thus removed is equal to 10, the drawing rate is equal to 25. The formula giving the drawing rate provided by our method may be established easily.

Supposing $e$ is the depth within which each elementary step acts on the sheet, while $l$ is the average length of the fibres, $i$ the breadth of the sheet on which the elementary drawing operations are excuted, L the breadth of the sheet and $z$ the rate of overlapping or number of fibres or bundles of fibres produced in each elementary fibre-removing step, that are superposed in any cross-section of the drawn sliver, the drawing ratio is equal to $$K = \frac{l \times L}{e \times i \times z}$$

Figure 3:
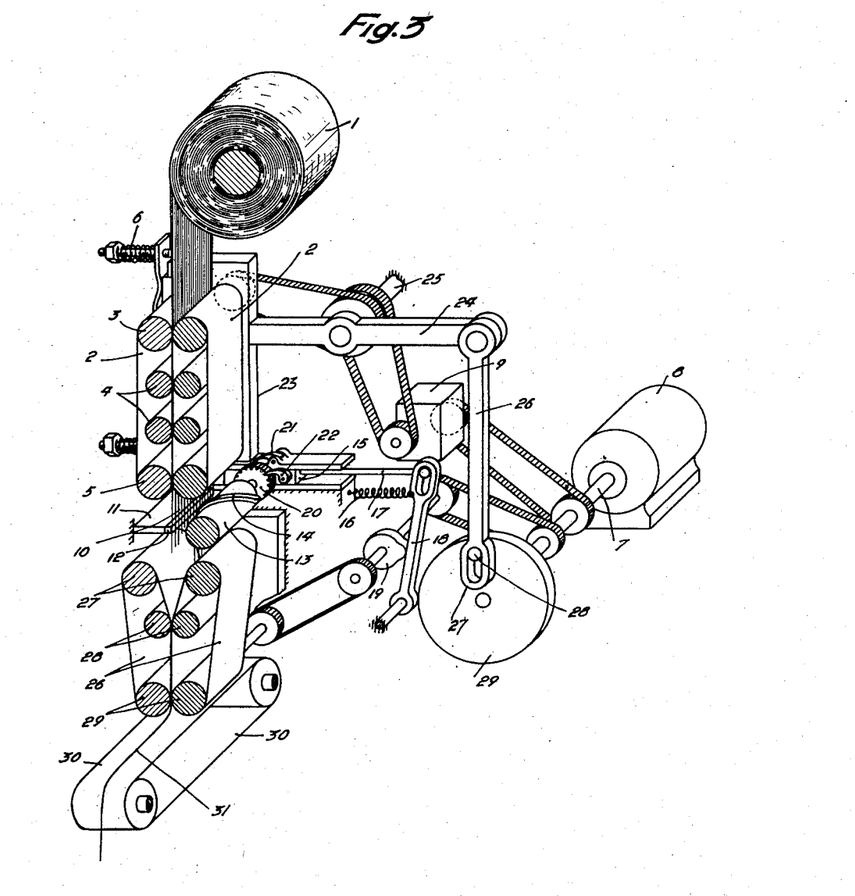
Fig. 3 is a perspective, partially sectional view of a drawing head according to our invention.

In the embodiment of a machine for executing our invention, as illustrated in Fig. 3, the sheet 1 is wound over a feed drum from which it is unwound so as to enter a feed gear 2 constituted by endless canvas strips engaged by rolls 3, 4 and 5 urged against each other pairwise by spring-operated means 6. The rolls 3 are controlled by the main driving shaft 7 of the machine which is driven by an electric motor through transmission chains, the transmission between the shaft 7 and the rollers 3 driving the feed gear including chains and a speed-reducer 9 so as to cause the sheet to progress by a length e during each series of fibre-removing operations performed throughout the lower edge of the sheet which is thus nibbled away.

The lower edge 10 of the sheet passing out of the feed gear, moves in front of a strip 11 the edge of which is provided with a rubber lining 12. In front of this strip 11 and in parallelism therewith lies the axis of a cylinder 13 carrying a helical thread 14. The cylinder 13 is revolubly carried inside a transversely sliding bushing 15, said bushing being urged towards the rubber-lined strip 11 by spring means 16 while a linkage 17, 18 acts on said bushing in the opposite direction and is itself controlled by a cam 19 which defines thus at every moment the spacing between the cylinder 13 and the lining 12 on the strip 11.

To the spindle carrying the cylinder 13 is also secured a pinion 20 cooperating with a catch 21 carried by the stationary frame of the machine. This catch causes the cylinder 13 to revolve by one fraction of a revolution each time the cylinder 13 is urged away from the strip 11. The angle by which the cylinder is shifted at each time is such that the transverse progression of the part of the thread 14 engaging the rubber lining 12 is at the utmost equal to the breadth of said thread 14. A pawl 22 holds the cylinder angularly fast after each angular shifting.

The feed gear 2 with its rolls 3—4 is mounted on a support 23 carried in its turn at the end of a lever 24 pivotally secured to a spindle 25 carried by the frame of the machine. The other end of said lever 24 is controlled by a connecting rod 26 provided at its other end with a slideway 27 cooperating with a crank pin 28 rigid with a plate 29 keyed to the main shaft 7 controlling the machine. The angular setting of the plate 29 and that of the cam 19 and also the relative sizes of the different parts are such that the support 23 is raised to a height corresponding e. g. to the average length of the fibres forming the sheet 1; at the moment at which the cam 19 is no longer in contact with the lever 17 i. e. at the moment at which the thread 14 of the cylinder 13 is urged against the rubber lining 12 on the strip 11, the ends of a number of fibres forming the sheet are clamped by the arrangement.

Underneath the strip 11 and the cylinder 13 is positioned a conveyor system including two endless belts 26 driven by and stretched over the rollers 27, 28, 29, between which belts the fibres removed from the sheet drop onto a transverse conveyor 30 on which they collect so as to form a sliver 31.

The arrangement that has thus been described operates in the following manner:

The sheet 1 is carried along by the feed gear 2 at a very low speed; the cylinder 13 controlled by the cam 19 and the linkage 17, 18 is urged by the spring 12 against the strip 11. The thread 14 on the cylinder 13 engages then the lining 12 on said strip 11 so as to clamp between the said lining and said thread a number of the fibres forming the sheet 1. At this moment, the support 23, carrying the feed gear and carried itself by the lever 24, is raised by the action of the crank pin on the connecting rod 26 through a height that is equal e. g. to the average length of the fibres as stated. The fibres clamped between the thread 14 and the lining 12 are thus drawn out of the sheet. At the same moment, the cam 19 acting on the link 18 urges apart the cylinder 13 and the strip 11 through the agency of the link 17. The fibres thus removed drop into the conveyor system 26 and thence onto the conveyor 30. During the rearward movement of the cylinder 13, the catch 21 constrains the pinion 20 to revolve by a fraction of a revolution, the pinion being then held fast, in the position thus assumed by it, by the pawl 22. The cylinder 13 is now urged back against the lining 12 on the strip 11 and the angular shifting of the cylinder that has been provided in the meantime, has brought a further point of the thread 14 into contact with the lining, the distance between the successive contact points being at the utmost equal to the breadth of said thread considered longitudinally of the cylinder. It is thus apparent that the thread 14 engages in succession the different points of the strip 11 and provides thus a nibbling away of the whole lower edge of the sheet 1.

In the embodiment illustrated in Fig. 4, the sheet is again shown at 1 in association with the feed gear 2 provided with the rolls 3, 4 and 5, that are again held in position by fastening means constituted by springs 6 as precedingly.

Figures 4, 5:
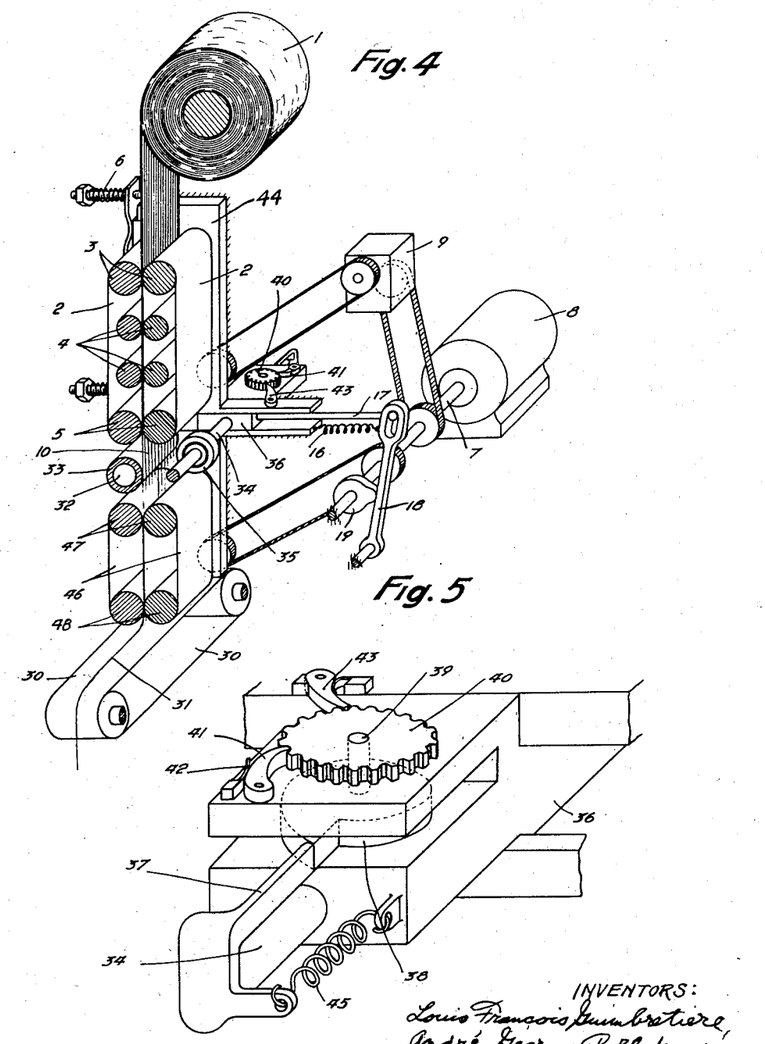
Fig. 4 is a similar view of a second embodiment of such a head.
Fig. 5 is a detail view of the arrangement providing for the transverse shifting of the fibre-removing means in said second embodiment.

The feed gear is controlled by the main shaft of the machine 7, driven by the motor 8, through a speed reducer 9 so as to provide as precedingly a longitudinal progression of the sheet by a length e after each cycle of fibre-removing steps. The front edge 10 of the sheet passing out of the feed gear progresses in front of a cylinder 32 carrying an outer rubber lining 33. In front of the cylinder 12 is mounted a shaft 34 carrying a loose roller and adapted to slide longitudinally inside a bushing 36. Said bushing 36 is controlled by a linkage 17, 18 and by a cam 19 keyed to the main shaft of the machine in a manner similar to that described for the control of the bushing 15 of Fig. 3. Said bushing 36 is also submitted to the action of a spring 16 so as to be moved in a direction urging the roller 35 against the cylinder 32. The shaft 34 extends through the bushing 36 but is provided at its other end with a projection 37 engaging a horizontal cam 38, the spindle 39 carrying which is revolubly carried by the bushing 36 (Fig. 5). On the upper surface of the lateral projection of the bushing 36 is positioned a toothed wheel 40 keyed to the said spindle 39. This toothed wheel 40 cooperates with a pawl 41 submitted to the action of a spring 42 and adapted to prevent the cam that is angularly rigid with the toothed wheel 40 from rotating anticlockwise (Fig. 5). The toothed wheel 40 may, furthermore, be engaged by a catch 43 carried by the stationary frame 44 of the machine in a manner such that, when the bushing 36 is moving outwardly, the catch 43 may make the wheel 40 and the cam 38 rotate clockwise through a predetermined angle, whereby the cam shifts the shaft 34 longitudinally through action on the projection 37. A spring 45 urges the projection 37 into contact with the cam 38.

The cylinder 32 is driven at a high speed by means of a transmission gear that is not illustrated and that is controlled by the main shaft 7 of the machine. Underneath the cylinder 32 and the shaft 34 is positioned a vertical conveyor including two endless belts 46 wound over rolls 47 and 48 and adapted to transfer the dropping fibres onto a horizontal conveyor 30, on which said fibres collect so as to form a sliver 31. The rolls 3, 4, 5 of the feed gear 2, the cylinder 32 and the rolls 47 and 48 of the conveyor 46 are revolubly carried by the stationary frame 44.

The above described embodiment operates as follows:

The sheet 1 is driven by the endless belts of the conveyor 2 at a low speed. The roller 35 is urged periodically by the spring 6 cooperating with the linkage 17—18 and the cam 19 against the cylinder 32. During this engagement period for the roller 35, the fibres lying in front of said roller 35 are clamped between the latter and the rubber lining 33 on the cylinder 32, said cylinder rotating at a speed which is much higher than the speed at which the sheet is fed, and the fibres thus taken hold of are removed from the sheet and fed by the conveyor means 46 onto the horizontal conveyor 30.

After one fraction of a revolution of the main shaft of the machine, which fraction of a revolution corresponds to a peripheral travel of the cylinder 32 that is higher than the average length of a fibre, the roller 35 is shifted back by the linkage 17—18; during this movement, the toothed wheel 40 meets the catch 43 which constrains it to revolve by a fraction of a revolution. The cam 38 moves consequently by the same fraction of a revolution and urges the projection 37 outwardly. The outline of the cam 38 is such that for each rearward movement of the roller 35, the shaft 34 and consequently the roller 35 are shifted longitudinally by a distance that is equal at the utmost to the breadth of the roller 35. The roller 35 removes thus at each revolution of the main shaft 7 a fraction of the terminal fibres of the edge 10 of the sheet. When the projection 37 has reached the outer end of its allowed travel, it passes off the outer section of the cam 38 on to its inner section and the spring 45 returns the whole system 34, 35 and 37 back into its starting position at the other end of the sheet.

In the embodiment illustrated in Fig. 6, the sheet 1 is again illustrated together with the feed gear 2, its rolls 3, 4, 5 and its clamping means 6. The feed gear is also driven by the main shaft 7 of the machine controlled by the motor 8, through a speed-reducing gear 9.

Figures 6, 7:
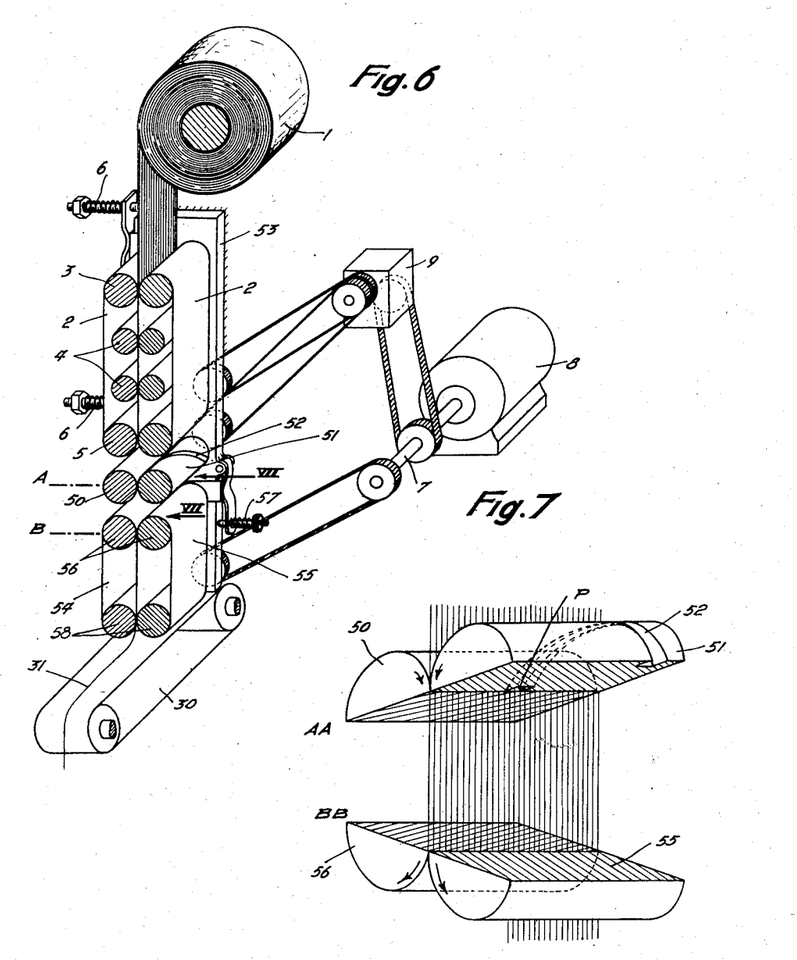
Fig. 6 is a perspective view of a third embodiment.
Fig. 7 is a perspective view in the direction of the arrow VII—VII of Fig. 6, the part of the device extending between the levels A—A and B—B being cut out in Fig. 7.

Underneath the above-described feed gear, the same stationary frame 53 which carries the latter also carries a double conveyor belt 54, 55, and the upper rolls 56 of this double conveyor are urged against each other by a spring system 57; two further rolls 58 provide for the tensioning of this double conveyor, the belts 54, 55 of which are driven by the main shaft of the machine at a speed that is higher than the speed assumed by the fed gear. Underneath the conveyor 54—55 is mounted a horizontal conveyor 30 on which the fibres fed by the vertical conveyor 54—55 collect to form a sliver 31.

The arrangement illustrated in Fig. 6 operates as follows: the edge of the sheet 1 is fed by the feed gear and is clamped between the cylinders 50 and 51 except for the section in register with the helical groove 52, in the cylinder 51, at a point P as illustrated in Fig. 7. The double conveyor 54, 55 exerts on all the fibres a tractional stress which is adjusted by the spring means 57 to a value that is less than the breaking strain of said fibres. The fibres of the sheet that are clamped between the cylinders 50 and 51 cannot be shifted under the action of the tractional stress thus exerted by the double conveyor, while, in contradistinction, the fibres located in register with the point P are free and may be removed. The cylinder 51 being driven into rotation, the point P moves gradually along the contact line between the cylinders. The lower edge of the sheet 1 is thus gradually nibbled off throughout its breadth.

The machines illustrated in Figs. 8 to 11 form continuously operating machines and are not submitted to any reciprocating movement. These two machines resort to a principle according to which a clamping point is provided on a fraction of the breadth of the ribbon, which point is submitted to a relative movement that is higher than the speed at which the ribbon is brought thereto, and which is further shifted transversely so as to clamp the fibres over successive fractions of the front edge of the sheet, with a view to act on the fibres throughout the edge of the sheet.

In the arrangement described with reference to Fig. 3, the point at which the fibres are clamped between the projecting thread 14 and the edge 12 of the blade 10, is shifted after each elementary fibre-removing step and a longitudinal shifting is given to said point between two successive fibre-removing steps, so as to remove the clamped fibres from the sheet.

In the machine operating in a continuous manner, the clamping points are distributed in the intervals $l_1, l_2, l_3$ (Fig. 11) with a longitudinal shifting $c$ between two successive clamping points. This shifting $o$ corresponds to the distance over which the fibres are conveyed by the conveyor belt 26 between two elementary fibre-removing steps in the arrangement of Fig. 3.

Figure 8:
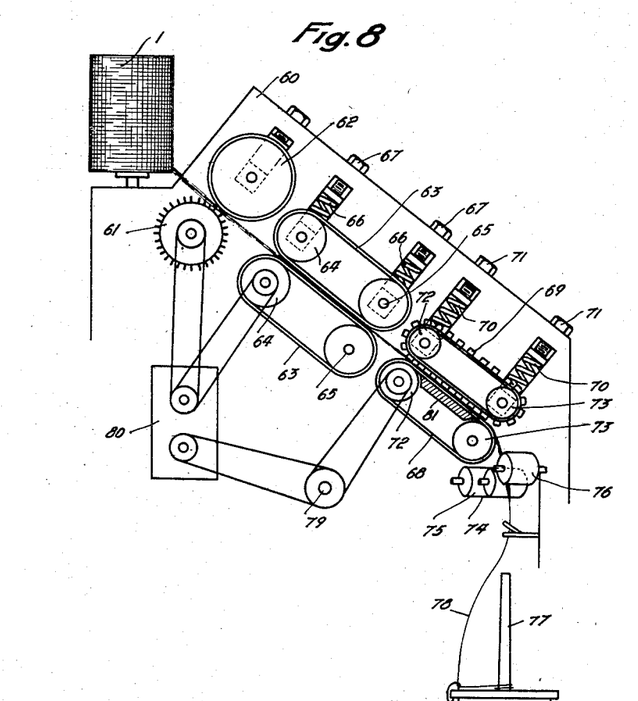
Fig. 8 is a longitudinal partly sectional view of a fourth embodiment of the head, as provided for operating in a continuous manner.
Figure 11:
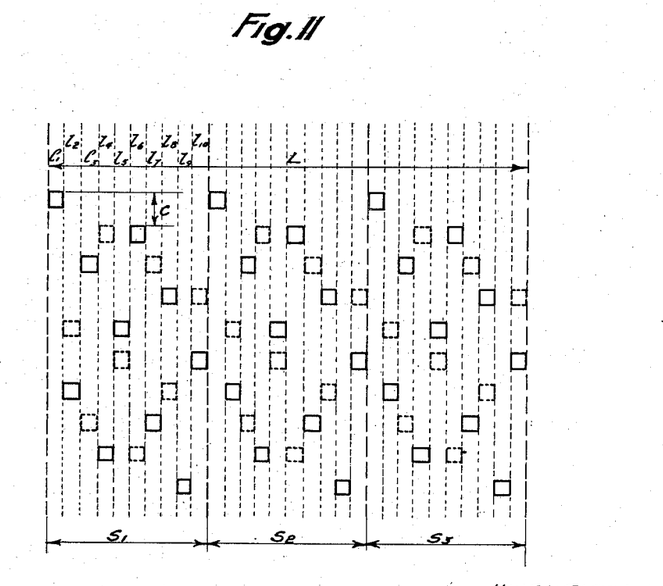
Fig. 11 is a plan view showing the distribution of the fibre-engaging projections raised on the conveyor belt of the arrangement of Fig. 8 or on the drum of the arrangement of Fig. 10.

Turning to the machine illustrated in Fig. 8, it includes a spool over which the sheet 1 is wound. This spool is carried by the stationary frame 60 of the machine. The sheet passes in succession first between a fluted cylinder 61 and a press cylinder 62 and then over a sheet-feeding conveyor belt 63 that is driven by rolls 64 and 65, the pressure exerted on the feed conveyor being adjustable by springs 66 and adjustable screws 67. Beyond these fibre-feeding means is mounted a drawing device constituted by two endless conveyor belts 68, 69 carried by rolls 72, 73 and urged against each other by a system of springs and screws 70, 71. The conveyor belt 69 is provided at its surface with small clamping projections or points distributed as illustrated in Fig. 11. At the output of said drawing device is positioned a transverse conveyor belt 74. The latter is carried by rolls 75 the axis of which forms an angle with the longitudinal axis of the arrangement. The conveyor belt 74 is provided with narrow slots while suction is applied to the lower surface of the conveyor belt so that the fibres from the drawing device may be collected in sliver formation. This sliver is clamped, at the end of the conveyor belt 74, over same by means of a pressure roller 76 and it is finally fed into a spinning spindle 77 of any known or suitable type, so as to form a thread 78.

Figure 9:
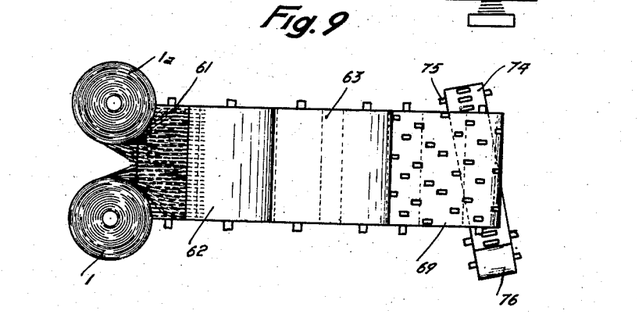
Fig. 9 is a plan view of the embodiment shown in Fig. 8.

In order to obtain a more homogeneous thread, it is of interest to braid several ribbons together, and we may for instance start with two spools carrying sheets 1 and 1a, the sheets being spread laterally by the cylinder 61 provided with clamping projections as shown in Fig. 9, and distributed throughout the breadth of the machine. The compound sheet thus formed is driven along at a low speed by the feed gear, while the cylinder 64 of the belt conveyor 63 and the projection-carrying cylinder 61 are driven synchronously by the main shaft 79 of the machine through the agency of a speed reducer. Each projection provided on the conveyor belt 69 engages in succession the ends of the different fibers forming the front edge of the sheet that is fed by the feed gear, over a fraction of the breadth of said sheet. The fibres thus clamped between the projections and the conveyor belt 68 are carried along by the latter at a speed that is higher than the speed at which the feed gear feeds the sheet of fibres. In order to keep the pressure at a constant value throughout a distance that is equal to at least the average length of the fibres, the conveyor belt 68 is held in position in the gap between the rolls by a carrier member 81. It is apparent that the machine thus executed nibbles the fibres in succession out of the sheet throughout its breadth and produces a drawing in conformity with our improved method.

In order to compensate for the modifications in density of the sheet throughout its breadth, we subdivide preferably the breadth of the sheet into say, three sections, $S_1, S_2, S_3$ as shown in Fig. 11 and the conveyor belt 69 is provided with projections distributed identically in the different longitudinal parts thereof registering with these three sections. We proceed in each of said sections with the execution of our improved method and the fibre bunches are collected again on the conveyor belt 74, which produces a plaiting with a ratio 3 of the different transverse sections of the original sheet.

Figure 10:
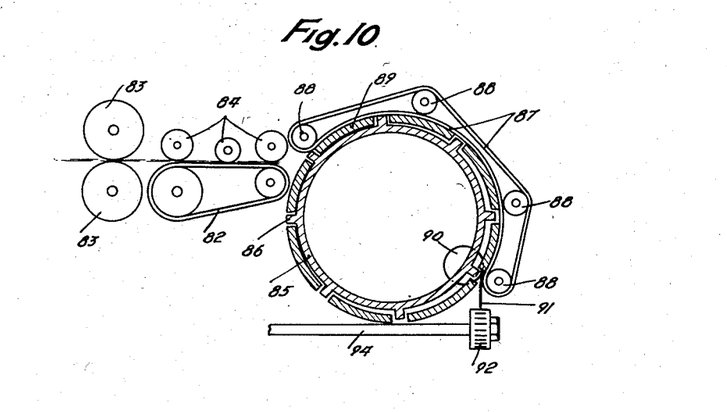
Fig. 10 is a longitudinal sectional view of a fifth embodiment.
Figure 12:
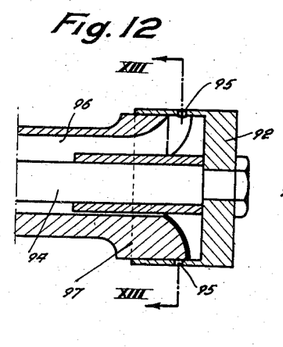
Fig. 12 is a sectional longitudinal view of one of the rollers providing for the collection of fibres at the output of the arrangement illustrated in Fig. 10.
Figure 13:
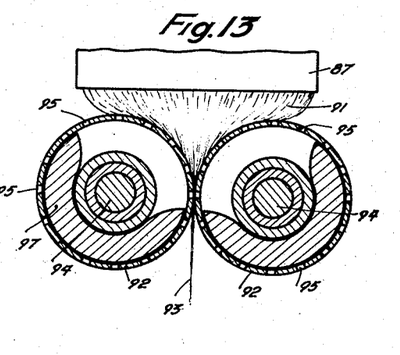
Fig. 13 is a sectional view through line XIII—XIII of Fig. 12 showing the operation of the fibre-collecting rollers.

The machine illustrated in Figs. 10, 12 and 13 includes a feed gear constituted by a conveyor incorporating pressure cylinders 83, 84, and a conveyor belt 82. The drawing arrangement is constituted by a cylinder 85 carrying at its periphery projections 86 distributed over its surface in a manner similar to that disclosed with reference to Fig. 8.

However, this arrangement may, in the case of certain types of fibres, show serious drawbacks by reason of the entangling of the fibres between the projections. In order to remove these drawbacks, the cylinder 85 carrying the projections 86 is enclosed with a slight eccentricity inside a ported cylinder 89 the diameter of which is slightly larger, each projection 86 on the cylinder 85 passing through a port in the cylinder 89. The cylinder 89 is submitted to the pressure of a roller 90 engaging a generating line diametrically opposed to that along which the fibres are removed from the sheet. The projections 86 project outside of the outer cylinder 89 whenever they pass in register with said fibre-removing generating line and with the portions of the cylinder 89 lying to either side of said generating line. On the opposite side of the cylinder, said projections recede in contradistinction inside the cylinder 89. The fibres after they have been removed are thus transferred onto a cylinder provided with no outer unevenness or projection. When they arrive at the end of the conveyor belt 87—88 engaging the outer cylinder 89, they are released and form a thin sheet 91. Underneath the location of said thin sheet 91 are mounted two cylinders 92 which are driven into rotation so as to collect the fibres from the sheet 91 and to form the sliver 93 (Fig. 13). In order to improve the step consisting in collecting the fibres together, each of the cylinders 92 that are carried by spindles 94 is provided with openings 95 in its lateral surface. These openings 95 communicate with a channel 96 inside the cylinder and inside which suction is applied so as to urge the fibres onto the surfaces of the cylinders 92. A core 97 associated with each cylinder 92 closes the openings 95 over a portion of the lateral surface of the cylinder extendnig between the common generating line of the cylinders 92 and a point at which the cylinder has returned into register with the edge of the sheet 91 fed by the conveyor 87. The sucking action is thus cut out immediately after the collecting of the fibres by the cylinders 92 is finished. The sliver 93 formed is then twisted into the form of a thread by means of a spindle of any known type such as that of the above referred to spindle 77.

In order to execute our method as improved, including a plaiting of the elementary slivers removed from different transverse lines of the sheet, it is possible to cause different fibre-removing means to act side by side on the same sheet as described with reference to the different above-disclosed embodiments: these different fibre-removing means are shifted longitudinally with reference to one another so as to shift similarly their lines of operation with the machines described with two or more than two ribbons obtained simultaneously from the same drawing head, these ribbons, say for instance the ribbons 1 and 1a (Fig. 9), being longitudinally shifted however as provided for instance by cutting off the end of one of the two ribbons a length corresponding to one half period of the cyclic operation to be wiped out.

What we claim is:

1. A method for drawing a sheet of non-continuous fibres distributed in an irregular manner, consisting in causing the sheet to progress at a reduced speed, clamping the progressing sheet to a moderate extent such that the fibres may slide longitudinally therein with reference to one another, exerting a progressive drive at a speed higher than the speed of progression of the sheet along the free edge of the latter beyond the clamping line thereon, said drive being exerted in succession on selected fractions of the breadth of the free edge of the sheet to draw the fibres in said selected fractions of the breadth of the sheet with a tractional stress that is higher than the fibre-retaining force produced by the clamping of the sheet ahead thereof, the different fractions of the free edge of the sheet being drawn in succession throughout the breadth of the sheet, and forming the fibres drawn from the successive fractions of the breadth into a sliver and repeating the drawing steps throughout the breadth of the sheet and incorporating the further drawn fibres into the sliver.

2. A method for drawing a sheet of non continuous fibres distributed in an irregular manner, consisting in causing the sheet to progress at a reduced speed, clamping the progressing sheet to a moderate extent such that the fibres may slide longitudinally therein with reference to one another, exerting a progressive drive at a speed higher than the speed of progression of the sheet along the free edge of the latter beyond the clamping line thereon, throughout a depth equal to a predetermined fraction of the average length of the fibres, said drive being exerted in succession on selected fractions of the breadth of the free edge of the sheet to draw the fibres in said selected fractions of the breadth of the sheet with a tractional stress that is higher than the fibre-retaining force produced by the clamping of the sheet ahead thereof, repeating said driving step to form a cycle of fibre-drawing operations extending throughout the breadth of the sheet, the sheet progressing during said cycle by a length equal to said fraction of the average length of the fibres, and repeating said cycle of operations as the sheet progresses and forming the fibres drawn in succession into a sliver.

3. A method for drawing a sheet of fibres including a plurality of parallel ribbons, consisting in causing each ribbon to progress at a reduced speed, clamping the progressing ribbon to a moderate extent such that the fibres may slide longitudinally therein with reference to one another, exerting a progressive drive at a speed higher than the speed of progression of the ribbon along the free edge of the latter beyond the clamping line thereon throughout a depth equal to a predetermined fraction of the average length of the fibres, said drive being exerted in succession on selected fractions of the breadth of the free edge of the ribbon to draw the fibres in said selected fractions of the breadth of the ribbon with a tractional stress that is higher than the fibre-retaining force produced by the clamping of the ribbon ahead thereof, repeating said driving step to form a cycle of fibre-drawing operations extending throughout the breadth of the ribbon, the ribbon progressing during said cycle by a length equal to said fraction of the average length of the fibres and repeating said cycle of operations as the ribbon progresses, the drive executed on the different elementary ribbons during a same cycle of operations being performed along a same transverse line of the original ribbon, removing the fibres drawn from the different fractions of the different ribbons along parallel paths and collecting them with a predetermined overlapping for each cycle to form a sliver.

4. A machine for drawing a sheet of non-continuous fibres, comprising a feed gear adapted to make the sheet progress at a reduced speed and including at least two paired elements in contact with each other across the sheet along a line extending transversely of the sheet, clamping means urging said elements into contact with each other across the sheet, sheet-drawing means fed by said feed gear and including at least two paired elements contacting with each other across the sheet along a line extending transversely with reference to the sheet and lying beyond the first mentioned transverse line, further clamping means urging the two last mentioned elements towards each other across the sheet, said drawing means being adapted to engage the fibres of the sheet and to remove them from the sheet at a speed higher than the speed at which the sheet is fed thereto by the feed gear, means for conveying the fibres removed from the sheet to collect said fibres in overlapping relationship in the form of a sliver, the contact line between the paired elements of one of the two parts; the feed gear and the drawing means, being interrupted along a fraction of the breadth of the location of the sheet between said elements in a manner such that the clamping stress exerted across predetermined fractions of the breadth of the sheet may be higher between the paired elements of the drawing means than that exerted on said fractions between the paired elements of the feed gear and means adapted to shift transversely through successive steps the contacting areas between those paired elements the contact line between which is interrupted, said shiftings being executed so as to cover periodically throughout the breadth of the sheet.

5. A machine for drawing a sheet of non-continuous fibres, comprising a feed gear adapted to make the sheet progress at a reduced speed while clamping the sheet to a reduced extent, fibre-removing means adapted to clamp in succession the ends of the fibres selectively throughout the breadth of the front edge of the sheet and through a depth of sheet equal to a predetermined fraction of the average length of the fibres, means constraining said fibre-removing means to become operative to actually clamp the ends of the fibres within a fraction of the breadth of the front edge of the sheet and means for shifting the fibre-removing means during the actual engagement thereof with the fibres, longitudinally of the sheet which is higher than the speed at which the sheet is fed by the feed gear, a conveyor, means for carrying the removed fibres on to the conveyor and to form them into a sliver and means for shifting the fraction of the breadth of the sheet on which the fibre-removing means are actually operative throughout the breadth of the front edge of the sheet.

6. A method of drawing a sheet of fibres consisting in clamping successively fractions of the breadth along the free edge of the said sheet, removing the fibres so clamped until fibers from the whole breadth have been so treated, repeating the clamping and fibre-removing steps after the sheet is moved forward by a length corresponding to the depth of the clamping, and positioning the material so removed in overlapping relationship to form a sliver.

References Cited in the file of this patent

UNITED STATES PATENTS

| | | |
|---|---|---|
| 1,452,352 | Ball | Apr. 17, 1923 |
| 1,932,095 | Webb | Oct. 24, 1933 |
| 2,110,215 | Foster | Mar. 8, 1938 |
| 2,196,621 | Battin et al. | Apr. 9, 1940 |